United States Patent [19]

Rastall et al.

[11] Patent Number: 4,525,492

[45] Date of Patent: Jun. 25, 1985

[54] MODIFIED PHENOLIC FOAMS

[75] Inventors: Mary H. Rastall, Sarnia; Norman H. Ng, Mississauga; Edwin J. MacPherson, Sarnia, all of Canada

[73] Assignee: Fiberglas Canada Inc., Toronto, Canada

[21] Appl. No.: 385,260

[22] Filed: Jun. 4, 1982

[51] Int. Cl.³ ............................. C08G 8/00; C08J 9/04
[52] U.S. Cl. ..................... 521/181; 521/186; 521/187; 521/128; 521/136
[58] Field of Search ............... 521/181, 187, 186, 128, 521/136

[56] References Cited

U.S. PATENT DOCUMENTS

| | | | |
|---|---|---|---|
| 2,168,981 | 8/1936 | Flood et al. | 525/501 |
| 3,256,216 | 6/1966 | Erickson et al. | 521/114 |
| 3,389,094 | 6/1968 | D'Alessandro | 521/114 |
| 3,694,387 | 9/1972 | Junger et al. | 521/103 |
| 3,740,358 | 6/1973 | Christie et al. | 521/103 |
| 3,872,033 | 3/1975 | Boden et al. | 521/181 OR |
| 3,907,723 | 9/1975 | Pretot | 521/112 |
| 3,915,905 | 10/1975 | Hanton | 521/128 |
| 3,953,645 | 4/1976 | Moss et al. | 428/310 |
| 4,122,045 | 10/1978 | Garrett et al. | 521/103 |
| 4,216,295 | 8/1980 | Dahms | 521/112 |
| 4,219,623 | 8/1980 | Sudan et al. | 521/85 |
| 4,239,881 | 12/1980 | Hasselman, Jr. | 528/164 |
| 4,252,908 | 2/1981 | Paladini | 521/117 |
| 4,275,170 | 6/1981 | McAllister et al. | 521/103 |
| 4,281,069 | 7/1981 | Harris | 521/123 |
| 4,303,758 | 12/1981 | Gusmer | 521/121 |
| 4,332,754 | 6/1982 | Meunier et al. | 264/45.5 |
| 4,417,004 | 11/1983 | Sudan et al. | 521/181 |

FOREIGN PATENT DOCUMENTS

| | | |
|---|---|---|
| 870050 | 5/1971 | Canada . |
| 873922 | 6/1971 | Canada . |
| 1084199 | 2/1980 | Canada . |
| 1117700 | 2/1982 | Canada . |
| 1513340 | 6/1978 | United Kingdom . |
| 2008120A | 5/1979 | United Kingdom . |
| 2024226A | 1/1980 | United Kingdom . |
| 2024227A | 1/1980 | United Kingdom . |

OTHER PUBLICATIONS

Chemical Abstracts: 85:125170s, (1976).
Chemical Abstracts: 91:194123q, (1979).
Chemical Abstracts: 92:42917j, (1980).
Chemical Abstracts 63:18389d, (1965).
Chemical Abstracts 67:109317t, (1967).
Chemical Abstracts 71:125531w, (1969).
Chemical Abstracts 80:15773e, (1974).
Chemical Abstracts 83:115978f, (1975).
Chemical Abstracts 84:136569j, (1976).

*Primary Examiner*—John Kight
*Assistant Examiner*—Garnette D. Draper
*Attorney, Agent, or Firm*—Cushman, Darby & Cushman

[57] ABSTRACT

Phenolic foams and a method of producing phenolic foam material from phenol-formaldehyde resins having a phenol to formaldehyde mole ratio of between about 1:3 and 1:4.5 are described. These materials are useful for insulation and other uses, particularly in the building trades. They are dimensionally and thermally stable, fire resistant and low in cost.

20 Claims, No Drawings

MODIFIED PHENOLIC FOAMS

This invention relates to the manufacture of foam from phenolic resins and to the foam so produced. More particularly, the invention relates to phenolic foams prepared from phenol-formaldehyde resoles having a phenol to formaldehyde mole ratio of between about 1:3 and 1:4.5.

In recent years, the price of energy for heating purposes has escalated. This has created increased interest in materials suitable for thermal insulation. Two popular insulation materials are polystyrene foam, a thermoplastic material based on polymerized styrene and polyurethane foam, a thermoset material prepared from diisocyanates and polyols. These materials are not very thermally stable and they are known to burn vigorously in case of a fire, unlike the more traditional thermal insulating materials, such as glass or mineral wool products, which do not burn, crack or shrink when properly bonded.

The shortcomings exhibited by organic foams have not prevented them from gaining widespread use for roof insulation, exterior sheathing insulation and for a number of other applications in the building trade. The relatively low capital cost required for a plant and for the equipment to manufacture these foams has also contributed to their popularity and growth.

Phenol formaldehyde foams share this renewed interest in organic foam materials with the polystyrene and polyurethane foams. Of the three types of foam material mentioned above, polystyrene, polyurethane and phenol-formaldehyde foams, the phenolic foams in particular, have thermal stability and a potentially low cost which makes them attractive.

Typically, they have been made by adding an acid catalyst to a phenol-formaldehyde resin containing a blowing agent and a surfactant. Water, formaldehyde and phenol may be liberated during the condensation reactions and during the foaming procedures. These materials must be removed from the foam, since water reduces the thermal performance and formaldehyde and phenol are environmentally undesirable.

The pure phenolics are friable, corrosive and will continue to smoulder after being heated. They can, however, be formulated, at relatively low cost, to give very fine celled foams which exhibit good dimensional and thermal stability and which will not smoulder or burn after heating.

In the following, the term low mole ratio phenol-formaldehyde resin refers to phenol-formaldehyde resins which have a low formaldehyde to phenol mole ratio, i.e. to resins in which the phenol component has been initially reacted with a relatively small amount of formaldehyde. Similarly, the term high mole ratio phenol-formaldehyde resin, refers to phenol-formaldehyde resins which have a high formaldehyde to phenol mole ratio, i.e. to resins in which the phenol component has been initially reacted with a relatively large amount of formaldehyde.

Known phenolic foams are generally made from low mole ratio phenol-formaldehyde resins. Such resins usually contain free phenol which can be released during the curing of the foam material and, thus, may present a health hazard. Due to the fact that foams made from low mole ratio resins contain relatively low amounts of formaldehyde in proportion to their phenol content, cross-linking in these foams is more limited. As a consequence, these foams tend to be thermoplastic and subject to dimensional change. Moreover, many of the known phenolic foams which are prepared with acid catalysts have been proven to be corrosive.

Numerous attempts have been made to improve the properties of the phenolic foams based on low mole ratio phenol-formaldehyde resins. Monomers have been added to these phenol-formaldehyde resins, however, the amount of monomers which those resins will accept is limited, since the resins lack appreciable quantities of free formaldehyde. To overcome these problems attempts have been made to add other types of resins to the low mole ratio phenol-formaldehyde resins. These additions have varied from an addition of a small percentage of non-phenolic resin to a phenolic resin to the addition of a small percentage of phenolic resin to a non-phenolic resin.

U.S. Pat. No. 4,219,623 to Sudan discloses foamable compositions made up of two components and the method of making the same. Component A comprises a phenol-formaldehyde resin, a blowing agent, a nitrogenous modifier and a surfactant. Component B comprises an acid catalyst system in ethylene glycol. The phenol-formaldehyde resin of component A is a base-catalyzed resole having a phenol to formaldehyde mole ratio of between 1:1 and 1:2. According to Sudan et al. the foam material may be produced by mixing component A after an aging period with component B.

U.S. Pat. No. 3,907,723 to Pretot relates to a method of making foam from base-catalyzed phenol-formaldehyde resoles having a preferred phenol to formaldehyde mole ratio of about 1:2.3. To these resins resorcinol, a blowing agent, dicyandiamide-formaldehyde resin, and an acid catalyst are added.

Canadian Pat. Nos. 807,050 and 873,922 to Hanton disclose a phenolic foam made by mixing a phenol-formaldehyde resole having a preferred phenol to formaldehyde mole ratio of about 1:2.3 to 1:2.5 with a silicone surfactant and adding to this mixture a nitrogenous compound, a blowing agent, and an acid hardener.

The above foam materials generally have been made using low mole ratio phenol-formaldehyde resoles with a relatively high free phenol content. Accordingly, these resins contain free phenol, but very little or no free formaldehyde.

Surprisingly, it has now been discovered that foams can be produced from phenolic resins which have been prepared from starting mole ratios of phenol to formaldehyde in the range of between 1:3 and 1:4.5. Phenol-formaldehyde resins which have been found to be useful in the manufacture of phenolic foams according to the invention are based on the base-catalyzed condensation of phenol with formaldehyde. Particularly useful are phenol-formaldehyde resoles catalyzed with alkaline earth metal hydroxides, particularly calcium hydroxide, such as described in Canadian Pat. No. 1,080,871 issued July 1, 1980 and U.S. Pat. No. Re. 30375 issued Aug. 19, 1980 to the same assignee. The disclosures of these patents are hereby incorporated by reference.

Such high mole ratios are the basis for resole resins which are, for all practical purposes, free of phenol and which can be treated with a formaldehyde scavenger or co-reactant, in order to reduce the initially high free formaldehyde content.

Phenolic foams are generally obtained by cross-linking a suitable phenolic resin by means of a catalyst in the presence of a blowing agent and a surfactant. The high mole ratio resins according to the invention, have to be modified with formaldehyde co-reactants in order to form a useful foam.

Co-reactants for formaldehyde used according to the invention are urea, melamine and dicyandiamide, or combinations of these materials. The most preferred co-reactant and the lowest cost material is urea. Resins with phenol to formaldehyde mole ratios of from 1:3 to 1:4.5 according to the invention can be reacted with these co-reactants in relatively large quantities. The modified phenol-formaldehyde resins can be converted into a foam material which, surprisingly, exhibits properties superior to those of foam based on a regular unmodified phenol-formaldehyde resin.

Reacting urea, melamine or dicyandiamide with the phenol-formaldehyde resoles to form modified phenol-formaldehyde resoles according to the invention serves several purposes. The reaction reduces the amount of free formaldehyde in the resole and thereby improves the foaming qualities of the modified resole. The reaction improves the anti-punking qualities of the resole producing a thermally stable resin. Particularly in the case of urea the reaction also means that the resole can be extended with a low cost material. Since, in contrast to low mole ratio resins, high mole ratio resins by themselves do not generally have adequate film forming properties, urea, melamine or dicyandiamide is added to improve the film.

It is generally desirable that the foams according to the invention contain a relatively high proportion of closed cells to enhance the foams' thermal insulation properties. A foam containing about 75% closed cells has a sufficiently low thermal conductivity to exhibit satisfactory thermal insulating properties, however, even higher percentages of closed cells are preferred.

According to the invention 100 parts by weight, calculated as resin solids of a high mole ratio phenol-formaldehyde resole are typically reacted with 10 to 55 parts by weight of the resin of a component selected from urea, melamine and dicyandiamide, whereby the ratio of resin to component is generally chosen such that substantially all urea, melamine or dicyandiamide is reacted with the free formaldehyde in the resin.

The relatively high amount of free formaldehyde in the high mole ratio resins according to the invention allows treatment of the resins not only with urea, melamine or dicyandiamide, but also with varying quantities of numerous other reactive monomers such as cresols and resorcinol which are able to react with the free formaldehyde present in these resins.

A great flexibility in formulating foam material is obtained by the use of these high mole ratio resins, as the added monomers may be chosen so as to render the foam substantially non-corrosive, to achieve better foaming characteristics, better cells, better resin film forming and thermosetting properties, etc. In addition to the phenol-formaldehyde resole, the urea, melamine or dicyandiamide, the blowing agent, the surfactant and the catalyst, the foamable mixtures may contain other materials such as fillers, as well as various modifiers to improve specific properties.

Accordingly, in one aspect of the invention there is provided a method of making a phenolic foam material comprising the steps of:

(1) preparing a phenol-formaldehyde resole having a mole ratio of phenol to formaldehyde of between 1:3 and 1:4.5; and (2) reacting 100 parts by weight, calculated as resin solids, of an aqueous solution of said resole with (a) 10 to 55 parts by weight of a component selected from the group consisting of urea, melamine and dicyandiamide, (b) 0.1 to 10 parts by weight of a surfactant; (c) 3 to 25 parts by weight of a blowing agent; and (d) a "catalyst". The catalyst may consist of an acidic material to reduce the pH of the mixture to below 4. In another aspect the catalyst may consist of a basic material to increase the pH of the mixture to above 8.

In another aspect of the invention there is provided a foamable phenolic composition comprising (1) 100 parts by weight, calculated as resin solids, of an aqueous solution of a phenol-formaldehyde resole having a mole ratio of phenol to formaldehyde of between 1:3 and 1:4.5; (2) 10 to 55 parts by weight of a component selected from the group consisting of urea, melamine and dicyandiamide; (3) 0.1 to 10 parts by weight of a surfactant; (4) 3 to 25 parts by weight of a blowing agent; and (5) a catalyst consisting of an acidic material to reduce the pH of the reaction mixture to below 4, or a basic material to increase the pH of the reaction mixture to above 8. This composition may be cured according to the invention to form a phenolic foam material adapted for use as insulation material for roofs and the like.

Blowing agents typically used for phenolic foams are materials which have atmospheric boiling points, from between about $-40°$ C. to $125°$ C. Examples of suitable known blowing agents are chlorinated and fluorinated hydrocarbons, such as trichlorofluoromethane (sold under the Trademark FREON 11), tetrafluoromethane, 1,1,2-trichloro-1,2,2-trifluoroethane (sold under the Trademark FREON 113), monochlorodifluoromethane, dichlorodifluoromethane, 1,1-dichloro-1,2,2,2-tetrafluroethane and mixtures of these; or chlorinated hydrocarbons, such as methylchloride, chloroform, methylenedichloride, carbontetrachloride and mixtures of these with fluorocarbons, or low boiling hydrocarbons, such as propane, butane, pentane, hexane or cyclohexane or low boiling ethers, such as dimethyl, diethyl and dipropyl ether; or low boiling materials, such as carbon disulfide, acetone, methyl alcohol and propyl alcohol, or materials which decompose under the influence of heat to generate nitrogen or another gas "in situ", such as diazo compounds; or materials which liberate carbon dioxide on heating, such as ammonium carbonate and bicarbonate; or materials which liberate carbon dioxide under the influence of acids, such as ammonium carbonate, calcium or sodium carbonate or sodium bicarbonate etc.

The quantities of the blowing agent employed vary with the type and the density of the foam desired. Generally about 3 to 25 parts by weight of the resin is satisfactory.

Surfactants which are generally used for phenolic foam manufacture are typically non-ionic in nature. Surfactants containing silicon are widely used, such as the silicon ethylene oxide/propylene oxide copolymers of alkoxy silanes, polysilyl/phosphonates, polydimethylsiloxane, polyoxyalkylene copolymers. Examples of suitable commercial silicon-containing surfactants are the Dow Corning Trademarks DC-190 and DC-193, and the Union Carbide Trademarks L-530, L-5310, L-5410. Other non-ionic sufactants, such as polyoxyethylene sorbitans of lauric, palmitic, stearic and oleic acid are also suitable, as are alkylated ethoxylated phenols of various molecular weights.

Ethoxylated straight chain alcohols such as the palmityl, stearyl and oleyl alcohols, are also useful as surfactants as are ethoxylated vegetable oils, fatty glycerides and fatty acids, such as stearic and oleic acids and condensates of ethylene and propylene oxide with propylene glycol. Mixtures of these non-ionic surfactants in combination with certain anionic surfactants will also provide useful foams, as will numerous surfactants of the trialkyl amine oxide type, such as stearyl dimethyl amine oxide and tallow amido-propyl dimethyl amine oxides and cationic surfactants of the alkyl dimethyl benzyl ammonium chloride type, such as an oleyl dimethyl benzyl ammonium chloride.

These materials will act as surfactants, or cell stabilizers for phenolic foams. They are usually required only in small amounts to be effective. Typically, from about 1 to 10% by weight of the resin is a satisfactory level. In some cases, less than 1% is effective.

The catalysts employed in the manufacture of phenolic foams are usually acids, however, basic catalysts may also be applied. Under certain circumstances foam may be generated solely by the application of heat without the use of a catalyst. In practice, however, a catalyst is necessary to complete the curing of the foams, as it is not feasible to do this by heating alone. The cure behavior of phenolic resins is discussed in more detail in chapters 5 and 10 in "The Chemistry of Phenolic Resins" by R. W. Martin, J. Wiley and Sons, Inc., 1956, which are hereby incorporated by reference.

Acid catalysts may be inorganic acids, such as sulfuric, phosphoric, hydrochloric, hydrobromic and boric acid and combinations of these acids; or inorganic acids in combination with inert or reactive carriers, or in combination with diluents which may be alcohols, polyols and plasticizers such as methanol, ethanol, propanol, butanol, or ethylene glycol, propylene glycol, polyethylene glycol, polypopylene glycol, dibutyl and dioctylphthalate and triethylphosphate.

Acid catalysts may also be organic acids such as methanesulfonic acid, ethanesulfonic acid, dimethylsulphate, acetic and trichloroacetic acid and the like, and benzene sulfonic, phenol sulfonic, xylene sulfonic, naphthalene sulfonic, paratoluene sulfonic, resorcinol sulfonic acid, or mixtures thereof. Moreover, catalysts may be mixtures of such organic acids in conjunction with inorganic acids, such as boric acid in combination with alpha-hydroxy keto acid (as taught in U.S. Pat. No. 3,298,973), or materials which liberate acids on heating in aqueous solution, such as boric anhydride (as taught in Canadian Pat. No. 1,026,068), phosphorous pentoxide, polyphosphoric anhydrides, maleic, phthalic and acetic anhydrides and numerous acid chlorides.

These acids are usually employed in sufficient quantity to lower the pH of the resin mixture to less than 4, but more or less can be employed, depending on the rate of foam formation desired. Generally about 1 to 35% by weight of the resin is satisfactory.

Basic catalysts such as alkali metal hydroxides are generally employed in sufficient quantity to increase the pH of the resin mixture to above 8. Again the quantity employed will depend on the rate of foam formation which is desired, but generally 5% to 20% by weight of the resin is adequate.

In addition to the phenol-formaldehyde resins, the urea, melamine or dicyandiamide, the blowing agent, surfactant and catalyst, the foam according to the invention may contain about 1 to 20% by weight of the resin of a curing modifier and about 1 to 20% by weight of the resin of a secondary modifier.

Plasticizers such as mineral oils, petroleum gels, as well as polyhydric alcohols and polyethylene or polypropylene glycols, may be used to improve flexibility.

Anti-punking agents may be added in order to reduce the tendency of phenolic foams to undergo thermal degradation on severe heating. Useful as anti-punking agents are, halogenated phosphate esters, such as tris-chloroethyl phosphate, tris-2,3-dibromopropyl phosphate; or phosphonium salts, such as tetrakis (hydroxymethyl) phosphonium chloride; or polymethylsiloxane oils; or borates, such as sodium tetraborate and anhydrous borax; or boric acid or boric anhydride; or combinations of boric acid with polyols, such as sorbitol or alpha-hydroxy keto acids; or phosphoric acid; or aluminum chloride hexahydrate; or antimony oxide itself or in combination with halogens; or nitrogen releasing materials such as urea, melamine or dicyandiamide.

Anti-corrosive agents may be employed to remove or reduce any residual acid catalysts remaining after foam formation. Thus, numerous materials selected from sodium tetraborate, anhydrous borax, calcium oxide, magnesium oxide, iron oxide, sodium and calcium silicates, dolomites, and alkali metal and alkaline earth metal carbonates are useful. In addition, certain finely divided metals, such as aluminum and zinc may be added. These materials may be used by themselves or in combination with various protective colloids to provide time release effects.

Protective colloids, such as gelatins, starches, and celluloses, may be utilized to provide improved cell stabilization and cell encapsulation, enhance physical properties, and in some cases, provide other additives, such as anti-corrosion materials with time release properties, so that they do not compete with the catalysts in the foam formation process.

Other polymers may be added to improve the film forming properties of the phenolic resin foams. For example, isocyanates, furfuryl alcohol prepolymers, polyvinyl alcohols, polyvinyl acetates, ethylene vinyl acetate copolymers, polyacrylates, liquid hydroxyl containing rubbers, gelatines, bone glues, zein, epoxy resins and soluble ammonium and calcium type lignins may be utilized.

Reactive monomers may be used to enhance the cure of the phenolic foams. For example, furfuryl alcohol, furfural, resorcinol, cresols, hydroquinone or catechols may be employed.

Viscosity control agents may be added to the resin to reduce the initial viscosity, thus allowing easier mixing, and to alter the viscosity build-up of the resin during foaming. Useful additives are acetamides, dimethyl formamide and methyl formate as well as various low boiling alcohols, such as methanol, ethanol, the propanols and butanols. A simple pH adjustment may also be effective in controlling the viscosity.

Fillers may be added to reinforce the foam. Useful fillers may be selected from graphite, pumice, fly ash, gypsum, basalt, fiberglass, sand and wood flour, or from clays, such as bentonite and montmorillonite. Clays, such as ZEOLITE (Trademark) which have ion exchange properties, are useful as fillers as well as to reduce the free acid in the foams. Fillers which can act as thermal radiation blocking agents, such as carbon black, mica and aluminum flake, or fillers which can act as neutron blocking agents, such as lead salts and other heavy metals, may be employed.

Materials, such as the aluminum phosphates and silicates, which are capable of forming ceramic structures in the foams under conditions of extreme high temperatures, may also be added.

Cell control agents, other than the usual surfactants, may be employed, such as N-methyl pyrrole, poly-N-vinyl-2-pyrrolidone, poly-N-vinyl-caprolactam and N-methyl pyrrolidone. These materials assist in uniform cell formation.

In a preferred emodiment of the invention a phenol-formaldehyde resole having a mole ratio of phenol to formaldehyde of between 1:3 and 1:4.5 is prepared. Such a resole generally has a very low free phenol content. The resole (100 parts by weight calculated as resin solids) is reacted with 20 to 55 parts by weight of a component selected from urea, melamine and dicyandiamide. The resulting resin, which generally does not contain any significant amounts of free urea, melamine or dicyandiamide, respectively, is mixed with 0.1 to 10 parts by weight of a surfactant and 3 to 25 parts by weight of blowing agent to form a foamable composition. Optionally, 1 to 25 parts by weight of curing modifiers and/or 1 to 20 parts by weight of other modifiers may be added. Foam formation is initiated by adding an acidic catalyst so as to lower the pH of the mixture to below 4. Following this, the mixture is cured with assistance of heat, or by use of a dielectric or microwave energy source.

In a further preferred embodiment of the invention, 100 parts by weight, calculated as resin solids, of a phenol-formaldehyde resole of the kind described above and having a mole ratio of phenol to formaldehyde of between 1:3.5 and 1:4, is reacted with 25 to 45 parts by weight of urea. The resulting phenol-formaldehyde-urea resin, which is substantially free of unreacted urea, is mixed with 0.5 to 6 parts by weight of a surfactant, 3 to 25 parts by weight of a blowing agent and, optionally, 1 to 25 parts by weight of a curing modifier and/or 1 to 20 parts by weight of other modifiers. Foam formation is initiated by the addition of an acidic catalyst which reduces the pH of the mixture to below 4. The resulting mixture is cured to form a foam material having substantially uniform cells.

The following preparations and examples describe the manner and process of making the invention and set forth the best mode contemplated by the inventors of carrying out the invention, but are not to be construed as limiting.

Examples 1 to 3 illustrate the method of preparing resoles suitable for use in phenolic foams of the invention.

EXAMPLE 1

A phenol-formaldehyde resole with a phenol to formaldehyde mole ratio of 1:3.2 was prepared by charging a 3 litre reactor, equipped with a stirrer, cooling/heating coil and thermometers with 818.09 g (8.53 m) of 98% phenol and 1860.43 g of 44% formaldehyde (27.3 m). A catalyst solution consisting of 70.84 g of 50% sodium hydroxide solution was added to the mixture over a 15 minute period during which time, the temperature of the reaction was allowed to rise from 40° C. After the addition the mixture was heated at 50° C. When one hour had elapsed, the temperature was raised to 60° C. and held there for a further hour, at which time, the temperature was raised to 70° C. and held there for the remainder of the resole preparation.

The free formaldehyde content of the mixture was monitored throughout the reaction period and when it began to level off at around 7.7%, the mixture was stripped in vacuum at 28" Hg° to remove much of the free water contained in the resole. This high solids resole at pH 9.2 was then cooled and neutralized with 85% phosphoric acid to pH 7.5.

This resole had the following properties:

| Free formaldehyde | 10.81% |
|---|---|
| Free phenol | 0.1% |
| Solids (150° C. for 2 hours) | 71.13% |
| Viscosity at 20° C. | 16,300 cps |
| | (Brookfield LV4) |
| Av. Mol. wt. (Mw) | 664 |
| | (gel permeation) |
| Dilutability | Infinite |
| | (in water) |
| Gel Time | 465 sec. |

EXAMPLE 2

A phenol-formaldehyde resole with a phenol to formaldehyde mole ratio of 1:3.7 was prepared according to the method described in Canadian Pat. No. 1,092,741, by charging a 3000 gal. reactor with 2234 gal. of 44% formaldehyde and 912 gal. of 98% phenol with stirring. A calcium hydroxide sold by Beachville Chemical at 99% purity (grade #880) was added as catalyst over a period of one hour and 35 minutes.

The temperature at this point was about 86° F. It was held at 86° F. for about 25 minutes and then allowed to rise to 110° F. for about 28 minutes. The temperature was then allowed to rise to 125° F. in 20 minutes and was held there for about 40 minutes. The temperature was then allowed to rise to 150° F. in 50 minute period and was held there for about 55 minutes until the free formaldehyde had dropped to 8.2%. The mixture was then cooled to 80° F. and the final pH was 8.55.

A resin prepared according to the procedure has the following properties:

| Organic solids | 44.5% |
|---|---|
| Ash as CaO | 2.03% |
| Free formaldehyde | 8.2% |
| Free phenol | 0.1% |
| pH | 8.55% |
| Gel Time | 512 sec. |
| (after neutralization to pH 8.2) | |
| Dilutability | Infinite. |

EXAMPLE 3

A phenol-formaldehyde resole with a phenol to formaldehyde mole ratio of 1:3.7 was prepared by charging a 25 gallon reactor equipped with a stirrer, heating/cooling jacket, condenser and vacuum supply was charged with 50.5 lbs of 98% phenol and 134.5 lbs of 44% formaldehyde. After mixing, the temperature was found to be 32° C. and 4.5 lbs of 50% sodium hydroxide solution was added over a period of 10 minutes, during which period the temperature was allowed to rise to 38° C. It was held at this temperature for a period of one hour and then the temperature was allowed to rise to 43° C. After a further hour, it was allowed to rise to 50° C. and held there for one hour. The temperature was then raised to 63° C. and held there until the free formaldehyde level had dropped to 9%. At this time, vacuum was applied and the material stripped to remove approximately 72 lbs of water and provide a resin with 71.6% total solids, 14.3% free formaldehyde, infinite dilutability and a molecular weight from gel permeation data of MW 448.

The following examples illustrate several preferred methods of preparing phenolic foams according to the invention.

EXAMPLE 4

To 100 parts by weight, (as resin solids), of a phenol-formaldehyde resole having a phenol to formaldehyde mole ratio of 1:3.2, prepared according to the procedure of Example 1, were added 20 parts by weight of powdered urea. This mixture was stirred at room temperature for approximately 2 hours until the urea had dissolved. To this mixture was added 3 parts of Dow Corning DC-193, a silicone surfactant, 15 parts of FREON 113, a blowing agent, and 5 parts of furfuryl alcohol, a modifier. After thorough mixing, 10 parts by weight of a 50:50 mixture of sulfuric acid in ethylene glycol was added with mixing to generate a foam which was subsequently cured in a forced air oven at 90° C. By varying the amount of acid catalyst employed and the amount of blowing agent and other parameters, the density of the foam could be varied. Some typical properties of these types of foam are as follows:

|  |  | Density (pcf) |
|---|---|---|
| K value 75° F. mean | 0.235 BTU/in ft$^2$ hr °F. | 2.5 |
| Flexural Strength | 26 psi | 2.4 |
| 5% Compressive Strength | 11.2 psi | 2.9 |
| 10% Compressive Strength | 21.3 | 2.7 |
| Compression to Yield | 23 | 2.7 |
| Swelling | −0.3% | 2.5 |
| Autoclaved Compression at 25% | 22 psi | 2.5 |
| Moisture Content | 5.6% | 2.5 |

By using similar techniques, the following foam samples were prepared.

EXAMPLE 5

To 100 parts by weight, as resin solids, of a phenol-formaldehyde resole having a phenol to formaldehyde mole ratio of 1:3.2 prepared according to Example 1, were added 36.2 parts of urea solids, 5.0 parts of DC-193, 16.0 parts of furfuryl alcohol and 24 parts of FREON 113. After thorough blending, 35.1 parts of 65% phenol sulfonic acid was added to the mass with vigorous stirring. A foam was generated which was cured in an oven at 90° C. for a period of 12 minutes. After aging, this particular sample was found to have a density of 1.7 pcf, very fine uniform cells and good strength with minimal void areas.

EXAMPLE 6

To 100 parts by weight as resin solids, of a phenol-formaldehyde resole having a phenol to formaldehyde mole ratio of 1:3.2 prepared according to the procedures of Example 1, were added 35 parts by weight of urea, as resin modifier, 16 parts of furfuryl alcohol as a cure modifier, 2.0 parts of TWEEN 40 (Trademark of Atlas ICI) as a surfactant and 9.0 parts of pentane as a blowing agent. After thorough mixing and emulsification, 19.2 parts of a 50:50 blend of sulfuric acid in ethylene glycol was added with mixing. Within a short period of time, a foam was generated which was subsequently cured in an oven at 90° C for a period of 15 minutes. After aging, this foam was found to have a density of 1.8 pcf with a very fine uniform cell structure.

EXAMPLE 7

To 100 parts by weight as resin solids, of a phenol-formaldehyde resole having a phenol-formaldehyde mole ratio of 1:3.2 prepared according to the procedures of Example 1, were added 35 parts by weight of urea solids. Following several hours of mixing 4.0 parts of TWEEN 60 as surfactant and 24 parts of FREON 113 as blowing agent were added. After thorough blending, 31.2 parts of 65% phenol sulfonic acid was added to generate a foam which was subsequently cured in an oven for 5 minutes at 90° C. The resulting foam was found to have a density of 2.5 pcf, very fine uniform cells and a pink colour.

EXAMPLE 8

100 parts by weight, as resin solids, of a phenol-formaldehyde resole with a phenol to formaldehyde mole ratio of 1:3.2, prepared according to Example 1, were treated with 15.0 parts of melamine as modifier at moderate temperatures. When the melamine had dissolved in the resole, 20.0 parts of urea were added as a second modifier. After solution of the urea, 5.0 parts of DC-193 was added as surfactant, followed by 16 parts of furfuryl alcohol as cure modifier and 20 parts of FREON 113 as blowing agent. When the resulting mixture was thoroughly blended, 35.1 parts of 65% phenol sulfonic acid was added while mixing. After a short period of time a foam developed which was cured in an oven for about 11 minutes at 90° C. After aging, this light brown foam had a density of 2.2 pcf with very fine uniform cells.

EXAMPLE 9

To 100 parts by weight, as resin solids, of a phenol-formaldehyde resole with a phenol to formaldehyde mole ratio of 1:3.2, prepared according to procedures similar to Example 1, were added 20.6 parts of melamine. The mixture was stirred for 45 minutes at room temperature and then 20 minutes at 50° C. After cooling, 5.0 parts of DC-193, were added along with 16.0 parts of furfuryl alcohol and 32 parts of FREON 113. After blending, 35.1 parts of 65% phenol sulfonic acid was added with mixing to generate a hard black foam with very fine uniform cells and a density of 1.7 pcf.

As examples of foams prepared with a higher mole ratio resin, foams were made using resoles prepared according to the methods of Example 2.

EXAMPLE 10

To 100 parts by weight, as resin solids, of a phenol-formaldehyde resole with a phenol to formaldehyde mole ratio of 1:3.7, prepared using a calcium hydroxide catalyst according to the procedures of Example 2, were added 35 parts by weight of urea. After mixing, 5.0 parts of a surfactant DC-193was added, followed by 18 parts of FREON 113 and 16 parts of furfuryl alcohol. When blending was complete, 26 parts of 65% phenol sulfonic acid was added to catalyze the reactions and to generate a foam which, on curing, had fine uniform cells and a density of 1.9 pcf.

EXAMPLE 11

As an example of an alternative modifier, 24.8 parts of melamine were added to 100 parts by weight, as resin solids, of a phenol-formaldehyde resole having a phenol-formaldehyde mole ratio of 1:3.7 prepared according to the methods of Example 2. The mixture was stirred for some time at room temperature and then at 50° C for approximately 30 minutes. When solution had occurred, the mixture was treated with 5.0 parts of DC-193, 16.0 parts of furfuryl alcohol and 22.0 parts of FREON 113. After further blending, 31.2 parts of 65% phenol sulfonic acid were added to produce a fine celled uniform, very dark coloured foam, which, on aging, had a density of 2.1 pcf.

EXAMPLE 12

To 100 parts by weight, as resin solids, of a phenol-formaldehyde resol e with a phenol to formaldehyde mole ratio of 1:3.7, prepared with a calcium hydroxide catalyst according to the procedures of Example 2, were added 35 parts by weight of urea. After mixing, 1.2 parts of a surfactant BRIJ-96 (Trademark of Atlas ICI) was added, followed by 6.1 parts of FREON 113 and 3.0 parts of furfuryl alcohol. When blending was complete, 26.6 parts of 65% phenol sulfonic acid was added to catalyze the reactions and to generate a foam, which, on curing, had fine uniform cells and a density of 3.0 pcf.

EXAMPLE 13

To 100 parts by weight, as resin solids, of a phenol-formaldehyde resole with a phenol to formaldehyde mole ratio of 1:3.7, prepared with a calcium hydroxide catalyst according to the procedures of Example 2, were added 35 parts by weight of urea. After mixing, 1.25 parts of surfactant TWEEN 60 (Trademark of Atlas ICI) and 1.25 parts of surfactant CEDEPAL EL-670 (Trademark of CDC) were added, followed by 10 parts of FREON 113 and 10 parts of furfuryl alcohol. When blending was complete 31.25 parts of 65% phenol sulfonic acid was added to catalyze the reactions and to generate a foam, which, on curing, had fine uniform cells and a density of 2.30 pcf.

EXAMPLE 14

100 parts by weight, as resin solids, of a phenol-formaldehyde resole with a phenol to formaldehyde mole ratio of 1:3.7, prepared with a calcium hydroxide catalyst according to the method of Example 2, were treated with 35.0 parts of urea. After stirring at room temperature to effect dissolution of the urea, 2.0 parts of TWEEN 40, 16.0 parts of furfuryl alcohol and 8.0 parts of pentane were added. When the blending of this mixture was completed, 15.4 parts of a 50:50 mixture of sulfuric acid in ethylene glycol was added to catalyze the cure of the components. A foam with a density of 2.0 pcf and very fine cells resulted.

EXAMPLE 15

100 parts by weight as resin solids, of a phenol-formaldehyde resole With a phenol to formaldehyde mole ratio of 1:3.7, prepared using calcium hydroxide as catalyst according to the method of Example 2, were adjusted to pH 6.4 with phosphoric acid and treated with 15 parts of melamine and 20 parts of urea. The resulting mixture was stirred at 70° C. for a brief interval to effect solution of the two modifiers, prior tp cooling and storage at room temperature. The mixture was then treated with 5.0 parts of DC-193 and 23.0 parts of FREON 113. After thorough mixing, 33.8 parts of 65% phenol sulfonic acid were added with stirring. The addition of the acid caused the temperatures of the mass to rise and a pink coloured, very fine, uniform celled foam of a density of 1.9 pcf after curing was generated.

EXAMPLE 16

100 parts by weight, as resin solids, of a phenol-formaldehyde resole with a phenol to formaldehyde mole ratio of 1:3.7, prepared according to Example 2, were treated with 24.8 Parts of melamine powder. The melamine was mixed in at room temperature and solution Was effected by raising the temperature to 52° C. for about 30 minutes. After cooling, 5.0 parts of DC-193, 16.0 parts of furfuryl alcohol and 22 parts FREON 113 were added with mixing, followed by 31.2 parts of 65% phenol sulfonic acid to catalyze the cure of the material. The foaming mixture was placed in an oven at 90° C. and cured for 15 minutes. This resulted in a black coloured foam with very fine uniform cells and a density of 2.1 pcf.

EXAMPLE 17

To 46.2 parts by weight, as resin solids, of a phenol-formaldehyde resole with a phenol to formaldehyde mole ratio of 1:3.7 were added 11.5 parts of dicyandiamide, 8.0 parts of furfuryl alcohol, 2.0 parts of TWEEN 60 and 8 parts of FREON 113. To this blend was added 28 parts of 65% phenol sulfonic acid which, on mixing, gave a black coloured foam, which after curing and aging, had a density of 2.9 pcf.

EXAMPLE 18

To 100 parts by weight, as resin solids, of a phenol-formaldehyde resole with a phenol to formaldehyde mole ratio of 1:3.7, prepared with a calcium hydroxide catalyst according to a method similar to Example 2, were added 4 parts of BRIJ-96 as surfactant and 20 parts FREON 113 as blowing agent These materials were well mixed and to this was added a blend of 11.84 parts of m-cresol, 19.9 parts of urea and 26.3 parts of 65% phenol sulfonic acid. The mixture was thoroughly blended and placed in an oven at 90° C. After a few minutes, a fine celled foam with a density of 2.01 pcf was obtained.

EXAMPLE 19

To 100 parts by weight, as resin solids, of a phenol-formaldehyde resole with a phenol to formaldehyde mole ratio of 1:3.7 sodium hydroxide catalyzed resole, prepared with a sodium hydroxide catalyst according to a method similar to Example 3, were added 4 parts of DC-193 and 2 parts of NEKAL NF (Trademark of CDC) as surfactants and 20 parts of FREON 113 as blowing agent. These materials were well mixed and a blend of 2.0 parts of m-cresol were added, 33.52 parts of urea, 2.64 parts of water and 65% phenol sulfonic acid were added. The mixture was thoroughly blended and placed in an oven at 90° C. After a few minutes, a strong foam of a density of 1.76 pcf was obtained.

EXAMPLE 20

To 50 parts by weight, as resin solids, of a phenol-formaldehyde resole with a phenol formaldehyde mole ratio of 1:3.7 prepared with a calcium hydroxide catalyst using a method similar to Example 2, were added 5.7 parts of DC-193 surfactant and 5.7 parts of cyclohexane as blowing agent. These materials were well mixed and a blend of 12.9 parts of resorcinol, 9.1 parts of urea, 13.8 parts of ethylene glycol, and 15.3 parts of 50% sodium hydroxide solution was added. The mixture was thoroughly blended and placed in an oven at 90° C. After a period of time, a very strong foam with a density of 2.52 pcf and good cell structure was obtained.

EXAMPLE 21

To 50 parts by weight, as resin solids, of a phenol-formaldehyde resole with a phenol to formaldehyde ratio of 1:3.2, prepared according to Example 1, were added 5.7 parts of DC-193 and 8.52 parts of cyclohexane. After blending, a mixture comprising 12.9 parts of resorcinol, 9.1 parts of urea 13.8 parts of ethylene glycol and 15.3 parts of 50% sodium hydroxide solution was added with mixing. The resulting blend was placed in an oven and allowed to foam at 90° C. until cured. A strong foam with a density of 2.45 pcf resulted, which had a thermal conductivity of 0.159 BTU/in ft$^2$ hr°F.

EXAMPLE 22

Urea, 27.12 parts was reacted with 78.1 parts by weight of a phenol-formaldehyde resole prepared according to Example 2. After the reaction was complete, an additional 100 parts by weight of the resole, 20 parts of DC-193 and 25 parts of cyclohexane was added. These materials were well mixed and a blend consisting of 50.48 parts of resorcinol, 35.6 parts of urea, 54.01 parts of ethylene glycol and 59.88 parts of 50% sodium hydroxide solution was added. After thorough mixing, the mass was placed in an oven at 85° C. and after a period of time, a very strong foam with a density of 3.2 pcf and good cell structure was obtained.

EXAMPLE 23

Urea, 36.34 parts was reacted with 104.3 parts by weight of a resole resin prepared according to Example 2. The resulting mix was then treated with an additional 66.4 parts of the resole resin, 20 parts of DC-193 and 25 parts of cyclohexane. These materials were well mixed and a blend consisting of 106.7 parts of resorcinol and 93.3 parts of 50% sodium hydroxide solution was added. The components were thoroughly mixed and placed in an oven at 85° C. After a period of time, a very fine celled and strong foam, with a density of 2.61 pcf was obtained. This material had a closed cell content of 91.5%, according to ASTM D.2856 (Procedure C) and a thermal conductivity of 0.133 BTU/in ft$^2$ hr°F.

The embodiments of the invention in which an exclusive property or privilege is claimed are defined as follows:

1. A method of making a phenolic foam material consisting essentially of the steps of:
    (1) preparing a base-catalyzed phenol-formaldehyde resole having a mole ratio of phenol to formaldehyde of between 1:3 and 1:4.5 and containing substantially no free phenol; and
    (2) reacting 100 parts by weight, calculated as resin solids, of an aqueous solution of said resole of step (1) with:
        (a) 10 to 55 parts by weight of a co-reactant selected from the group consisting of urea, melamine and dicyandiamide to reduce the amount of free formaldehyde contained in said resole;
        (b) 0.1 to 10 parts by weight of a surfactant;
        (c) 3 to 25 parts by weight of a blowing agent; and
        (d) a catalyst consisting of an acidic material to reduce the pH of the mixture to below 4, or a basic material to increase the pH of the mixture to above 8.

2. A method as claimed in claim 1 wherein the resole is reacted with 20 to 55 parts by weight of said co-reactant (a), and wherein the catalyst is an acid.

3. A method of making a phenolic foam material consisting essentially of the sequential steps of:
    (1) preparing a base-catalyzed phenol-formaldehyde resole having a mole ratio of phenol to formaldehyde of between 1:3 and 1:4.5 and containing substantially no free phenol;
    (2) reacting 100 parts by weight, calculated as resin solids, of an aqueous solution of said resole with 20 to 55 parts by weight of a co-reactant selected from the group consisting of urea, melamine and dicyandiamide to reduce the amount of free formaldehyde contained in said resole;
    (3) adding to the product of step (2):
        (a) 0.1 to 10 parts by weight of a surfactant; and
        (b) 3 to 25 parts by weight of a blowing agent;
    (4) initiating foam formation by adding to the mixture of step (3) an acidic catalyst to reduce the pH of the mixture to below 4; and
    (5) curing the mixture of step (4).

4. A method as claimed in claim 3 wherein said Phenol-formaldehyde resole has a mole ratio of phenol to formaldehyde of between 1:3.5 and 1:4 and is reacted in step (2) with 25 to 45 parts by weight of said component.

5. A method as claimed in claim 1 or 2 wherein said a co-reactant (a) is urea.

6. A method as claimed in claim 1 or 2 wherein the resole is mixed with 0.5 to 6 parts by weight of a surfactant.

7. A method as claimed in claim 3 or 4 wherein the product of step (2) is mixed with 0.5 to 6 parts by weight of a surfactant.

8. A method as claimed in claim 3 or 4, wherein said phenol-formaldehyde resole has a mole ratio of phenol to formaldehyde of 1:3.7.

9. A foamable phenolic composition consisting essentially of:
    (1) 100 parts weight, calculated as resins solids, of an aqueous solution of a base-catalyzed phenol-formaldehyde resole having a mole ratio of phenols to formaldehyde of between 1:3 and 1:4.5 and containing substantially no free phenol;
    (2) 10 to 55 parts by weight of a co-reactant selected from the group consisting of urea, melamine and dicyandiamide;
    (3) 0.1 to 10 parts by weight of a surfactant;
    (4) 3 to 25 parts by weight of a blowing agent; and
    (5) a catalyst consisting of an acidic material to reduce the pH of the reaction mixture to below 4, or a basic material to increase the pH of the reaction mixture to above 8.

10. A composition as claimed in claim 9 which comprises between 20 and 55 parts by weight of said co-reactant (2), and wherein the catalyst is an acidic material.

11. A foamable phenolic composition consisting essentially of:
    (1) 100 parts by weight, calculated as resin solids, of an aqueous solution of a base-catalyzed phenol-formaldehyde resole having a mole ratio phenol to formaldehyde between 1:3.5 and 1:4 and containing substantially no free phenol;
    (2) 25 to 45 parts by weight of a co-reactant selected from the group consisting of urea, melamine and dicyandiamide;

(3) 0.5 to 6 parts by weight of a surfactant;
(4) 3 to 25 parts by weight of blowing agent; and
(5) an acidic catalyst to reduce the pH of the reaction mixture to below 4.

12. A composition as claimed in claim 9, 10 or 11 wherein the co-reactant (2) is urea.

13. A composition as claimed in claim 11 where said phenol-formaldehyde resole has a moleratio of phenol to formaldehyde of 1:3.7.

14. A phenolic foam material consisting essentially of the cured reaction product of:
   (1) 100 parts by weight, calculated as resin solids, of an aqueous solution of a base-catalyzed phenol-formaldehyde resole having a mole ratio of phenol to formaldehyde of between 1:3 and 1:4.5 and containing substantially no free phenol;
   (2) 10 to 55 parts by weight of a co-reactant selected from the group consisting of urea, melamine and dicyandiamide;
   (3) 0.1 to 10 parts by weight of a surfactant;
   (4) 3 to 25 parts of weight of a blowing agent; and
   (5) a catalyst consisting of an acidic material to reduce the pH of the reaction mixture to below 4 or a basic material to increase the pH of the reaction mixture to above 8.

15. A foam material as claimed in claim 14 which comprises between 20 and 55 parts by weight of said co-reactant (2) and wherein the catalyst is an acidic material.

16. A phenolic foam material consisting essentially of the cured reaction product of:
   (1) 100 parts by weight, calculated as resin solids, of an aqueous solution of a base-catalyzed penol-formaldehyde resole having a mole ratio of phenol to formaldehyde of between 1:3.5 and 1:4 and containing substantially no free phenol;
   (2) 25 to 45 parts by weight of a co-reactant selected from the group consisting of urea, melamine and dicyandiamide;
   (3) 0.5 to 6 parts by weight of a surfactant;
   (4) 3 to 25 parts by weight of a blowing agent; and
   (5) an acidic catalyst to reduce the pH of the reaction mixture to below 4.

17. A foam material as claimed in claim 14, 15, or 16 wherein the co-reactant (2) is urea.

18. A foam material as claimed in claim 16 wherein said phenol-formaldehyde resole has a mole ratio of phenol to formaldehyde of 1:3.7.

19. A method as in claim 4, wherein said co-reactant in step is urea.

20. A method as in claim 1 wherein the catalyst is a base.

* * * * *